United States Patent [19]  
Isaacs et al.

[11] 3,755,237  
[45] Aug. 28, 1973

[54] VINYL ACETATE-ALPHA OLEFIN COPOLYMER COMPOSITIONS

[75] Inventors: Philip K. Isaacs, Jerusalem, Israel; Alexander C. Paton, Bedford, Mass.

[73] Assignee: W. R. Grace & Co., Cambridge, Mass.

[22] Filed: Mar. 15, 1971

[21] Appl. No.: 124,540

Related U.S. Application Data

[63] Continuation-in-part of Ser. No. 106,287, Jan. 13, 1971, which is a continuation-in-part of Ser. No. 560,784, June 27, 1966, abandoned.

[52] U.S. Cl.... 260/29.6 TA, 260/29.6 T, 260/41 A, 260/41 B, 260/41 C, 260/41.5 A, 260/41.5 R, 260/78.5 E, 260/78.5 HC, 260/80.81, 260/80.7, 260/87.3
[51] Int. Cl..... C08f 29/10, C08f 29/50, C08f 45/02
[58] Field of Search............... 260/29.6 T, 29.6 TA, 260/80.81, 78.5 E, 78.5 HC, 87.3, 80.7, 41 A, 41 C, 41.5 R, 41.5 A

[56] References Cited
UNITED STATES PATENTS

| 2,800,453 | 7/1957 | Bondi et al. | 260/87.3 X |
|---|---|---|---|
| 3,196,134 | 7/1965 | Donat et al. | 260/78.5 HC |
| 3,240,766 | 3/1966 | Thomson et al. | 260/29.6 T |
| 3,314,908 | 4/1967 | Kagan et al. | 260/29.6 TA |
| 3,404,113 | 10/1968 | Lindemann et al. | 260/29.6 T |
| 3,431,226 | 3/1969 | Warson et al. | 260/29.6 TA |

*Primary Examiner*—William H. Short
*Assistant Examiner*—L. M. Phynes
*Attorney*—C. E. Parker and William L. Baker

[57] ABSTRACT

Novel copolymer compositions containing a predominant amount of vinyl acetate copolymerized with about 1 to 20 weight percent of $C_7$ to $C_{20}$ straight chain alpha olefin and about 0.1 to 30 weight percent of at least a third comonomer are particularly useful in coating compositions, e.g., paints and adhesives.

13 Claims, No Drawings

VINYL ACETATE-ALPHA OLEFIN COPOLYMER COMPOSITIONS

This application is a continuation-in-part of application, Ser. No. 106,287 filed Jan. 13, 1971, which is a continuation of application Ser. No. 560,784, filed June 27, 1966, both cases now abandoned.

This invention is directed to novel copolymer compositions and more particularly to polymeric compositions which are copolymers of vinyl acetate, straight chain alpha olefin and at least a third, different olefinically-unsaturated comonomer.

Copolymers of vinyl acetate have found wide use in a number of applications and particularly in the form of aqueous latices as coating compositions such as paints and adhesives. However, the inherent properties of the vinyl acetate itself require plasticization of the polymer in order to avoid the hard, brittle properties of the vinyl acetate component. Vinyl acetate copolymers have been plasticized by the use of external plasticizers such as dibutyl phthalate but the tendency of such materials to leach out from the films render them unsatisfactory for many applications. The more preferable method of plasticizing vinyl acetate polymers is by means of internal plasticizers or plasticization with comonomers such as the maleates and acrylates. However, the use of such plasticizing comonomers introduces undesirable characteristics to the polymers along with the plasticizing effects. For example, relatively high levels of alkyl acrylates must be used to achieve the desired degree of flexibility in a vinyl acetate polymeric film when used as a paint. Such comonomers also serve to alter and diminish to an undesirable extent the properties of the vinyl acetate itself.

It has now been found that by copolymerizing a relatively low amount of a straight chain alpha olefin with a predominant amount of vinyl acetate and one or more comonomers, advantageous properties can be imparted to the resulting polymer without the deficiencies of the prior art compositions.

Novel polymers of the present invention comprise from 50 to about 97, preferably about 65 to 95 weight percent of vinyl acetate, about 1 to 20 preferably about 3 to 18, weight percent of $C_7$ to $C_{20}$ straight chain alpha olefin, and from about 0.1 to 30, preferably about 0.1 to 25 weight percent of one or more additional unlike olefinically-unsaturated comonomers, the amounts being based upon the total weight of the copolymer. The polymers are preferably prepared by conventional emulsion-polymerization procedures and employed as aqueous latices.

In a particularly preferred embodiment, the vinyl acetate is employed at a level of 80 weight percent, the olefin is employed at a level of 10 weight percent and the third comonomer is an alkyl acrylate and is employed at a level of 10 weight percent. In an alternative embodiment, the olefin is present at a level of 10 weight percent and the third comonomer is a cross-linking comonomer and is present at a level of less than 1 weight percent.

The straight chain alpha olefin component employed in the present invention may be a single alpha olefin such as decene-1 or a mixture such as is prepared by conventional methods, e.g., by wax cracking or by ethylene telomerization. It should be understood that minor amounts of impurities may be present in the alpha olefin mixtures such as branched chain olefins, internal olefins, conjugated and non-conjugated diolefins, naphthenic hydrocarbons and saturated hydrocarbons.

As examples of comonomers which may be copolymerized with the vinyl acetate and the alpha olefin, mention may be made of the following:

a. Monovinyl aromatic hydrocarbons, such as styrene, p-methylstyrene, alpha-methylstyrene, m-ethylstyrene, p-fluorostyrene, o-chlorostyrene, 2,6-dichlorostyrene, m-trifluoromethylstyrene, o-cyanostyrene, m-nitrostyrene, p-nitrostyrene, vinyl naphthalene, and the like.

b. Alpha, beta-olefinically unsaturated nitriles such as acrylonitrile, methacrylonitrile, α-chloroacrylonitrile, α-trifluoromethyl-acrylonitrile, and the like.

c. Mono-olefinically-unsaturated carboxylic acid, especially alpha, beta-olefinically unsaturated carboxylic acids, for example, acrylic acid, methacrylic acid, crotonic acid, cinnamic acid, alpha-chloroacrylic acid, atropic acid, alpha-fluoroacrylic acid, maleic acid, fumaric acid, itaconic acid and the like.

d. Esters of mono-olefinically unsaturated carboxylic acids, for example, alkyl acrylates and methacrylates such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, n-octyl acrylate, n-decyl acrylate, hydroxyethyl acrylate, hydroxypropyl acrylate, ethyl methacrylate, n-butyl methacrylate, isobutyl methacrylate, n-amyl methacrylate, 2-ethylhexyl methacrylate, n-octyl methacrylate, n-decyl methacrylate, cyanoethyl acrylate, cyanobutyl acrylate, diethylaminoethyl acrylate, esters of dicarboxylic acids such as monoisopropyl maleate, mono-2-ethylhexyl maleate, mono-n-butyl fumarate, dibutyl maleate, diethyl maleate and diethyl fumarate, and the like.

e. Amides of acrylic acid such as acrylamide, N-methyl acrylamide, N-phenyl acrylamide, N,N-dimethyl acrylamide, N,N-dibutylacrylamide and the like.

f. Vinyl esters of carboxylic acids such as vinyl propionate, vinyl butyrate, vinyl benzoate, and the like.

g. Vinyl ethers such as vinyl isobutyl ether, vinyl decyl ether, and the like.

h. Vinyl halides such as vinyl chloride, vinyl fluoride, vinylidene chloride and the like.

i. Cross-linking monomers such as triallyl cyanurate, diethylene-glycoldiacrylate, trimethylolpropanetriacrylate and dienes such as 1,4-pentadiene and 1,7-octadiene, and the like.

The novel copolymers of the present invention are preferably prepared by emulsion polymerization methods. In one embodiment, the water and two-thirds of the amount of emulsifying agent plus a stabilizing polymer are preheated and blanketed with nitrogen. The buffer solution and 15 percent of the total activator employed is then added. The monomer mix, which also includes the remainder of the emulsifier and the catalyst, are then added at a constant rate. After the addition of the monomer blend is begun, the remainder of the activator solution is added at a constant rate. After all the monomer has been added to the reaction vessel, several incremental additions of catalyst are made.

The following non-limiting example illustrates the preparation of novel copolymers of the present invention.

EXAMPLE A

| Precook | Wt.% |
|---|---|
| Nonylphenoxypoly(ethyleneoxy)ethanol | 1.88 |
| Hydroxyethyl cellulose | 0.23 |
| Water | 38.86 |
| Monomer Blend | |
| Monomers | 53.36 |
| Nonylphenoxypoly(ethyleneoxy)ethanol | 1.0 |
| Tertiary butyl hydroperoxide | 0.19 |
| Buffer Solution | |
| Sodium bicarbonate (10% solution) | 0.60 |
| Catalyst System | |
| Ferric chloride solution (1% ferric solution) | 0.0026 |
| Sodium formaldehyde sulfoxylate | 4.62 |
| Tertiary butyl hydroperoxide (to be added in six equal portions) | 0.16 |

The precook mixture was heated to 90° C. and maintained at this temperature for one hour and blanketed with nitrogen. The temperature was then lowered to 70° C. and the buffer solution, the ferric chloride, and 15 percent of the sodium formaldehyde sulfoxylate was added. The addition of the monomer blend was then started at a rate such that three hours would be required for the addition of the monomer blend. After the addition of the monomer had begun, the remainder of the sodium formaldehyde sulfoxylate was added at a rate such that 6 ½ hours would be required for addition. After all the monomer had been added, the temperature was maintained at about 70° C. for one hour. Six equal amounts of tertiary butyl hydroperoxide was then made at half-hour intervals. After the sixth addition, the reaction was terminated.

Tables 1 and 2 below illustrate several vinyl acetate-/alpha olefin/mono-ethylenically unsaturated monomer copolymers of the present invention prepared according to the procedure of Example A. The levels of monomers reported are on a weight basis and are based on the total monomeric composition of the copolymers.

TABLE 1

| Example No. | Olefin Percent | Olefin Type | Vinyl acetate | Mono-2-ethylhexyl maleate (percent) | Solids (percent) | Conversion (percent) |
|---|---|---|---|---|---|---|
| 1 | 5 | $C_7-C_9$ | 94.7 | 0.3 | 56.1 | 99.0 |
| 2 | 7.5 | $C_7-C_9$ | 92.2 | .3 | 54.3 | 97.0 |
| 3 | 10 | $C_7-C_9$ | 89.7 | .3 | 47.0 | 84.0 |
| 4 | 10 | $C_9-C_{10}$ | 89.7 | .3 | 52.4 | 93.5 |
| 5 | 7.5 | $C_9-C_{10}$ | 92.2 | .3 | 51.0 | 91.5 |
| 6 | 5 | $C_{11}-C_{15}$ | 94.7 | .3 | 55.5 | 99.0 |
| 7 | 10 | $C_{11}-C_{15}$ | 89.7 | .3 | 54.8 | 98.0 |
| 8 | 15 | $C_{11}-C_{15}$ | 84.7 | .3 | 51.6 | 92.5 |
| 9 | 5 | $C_{15}-C_{20}$ | 94.7 | .3 | 52.8 | 94.0 |
| 10 | 10 | $C_{15}-C_{20}$ | 89.7 | .3 | 51.2 | 92.8 |

TABLE 2

| Example No. | Olefin Percent | Olefin Type | Vinyl acetate | Comonomer A Percent | Comonomer A Type | Mono-2-ethylhexyl maleate | Solids (percent) | Conversion (percent) |
|---|---|---|---|---|---|---|---|---|
| 11 | 5 | $C_7-C_9$ | 89.7 | 5 | 2-ethylhexyl-acrylate | 0.3 | 54.4 | 97.5 |
| 12 | 10 | $C_7-C_9$ | 84.7 | 5 | 2-ethylhexyl-acrylate | .3 | 44.2 | 79.0 |
| 13 | 5 | $C_7-C_9$ | 89.7 | 5 | dibutyl maleate | .3 | 51.2 | 91.5 |
| 14 | 10 | $C_7-C_9$ | 84.7 | 5 | dibutyl maleate | .3 | 49.6 | 89.0 |
| 15 | 5 | $C_9-C_{11}$ | 89.7 | 5 | 2-ethylhexyl-acrylate | .3 | 56.2 | 99.0 |
| 16 | 10 | $C_9-C_{11}$ | 84.7 | 5 | 2-ethylhexyl-acrylate | .3 | 53.8 | 96.0 |
| 17 | 10 | $C_9-C_{11}$ | 79.7 | 10 | 2-ethylhexyl-acrylate | .3 | 54.6 | 97.5 |
| 18 | 10 | $C_9-C_{11}$ | 69.7 | 20 | 2-ethylhexyl-acrylate | .3 | 45.7 | 81.7 |
| 19 | 10 | $C_9-C_{11}$ | 79.7 | 10 | dibutyl maleate | .3 | 53.4 | 95.5 |

In a preferred embodiment, the copolymers of the present invention are prepared according to the following procedure:

EXAMPLE B

| Monomer blend | Wt.% |
|---|---|
| Monomers | 53.57 |
| Water | 0.26 |
| Emulsifier System | |
| Nonylphenoxypoly(ethyleneoxy)ethanol | 0.66 |
| Sodium alkyl aryl sulfonate | 0.53 |
| Sodium acetate | 0.24 |
| Sodium citrate | 0.09 |
| Fumaric acid | 0.10 |
| Acetic acid (50%) | 0.06 |
| Water | 38.80 |
| Catalyst System | |
| Potassium Persulfate (5% solution) | 3.16 |
| Sodium Formaldehyde Sulfoxylate (5% solution) | 2.42 |
| Tertiary Butyl Hydroperoxide | 0.11 |
| 1% Ferric Chloride Solution 0.037cc per 100 grams monomer | |

The emulsifier system is placed in a reaction vessel and the temperature is raised to about 70° to 75° C. When the temperature is attained, the potassium persulfate and the addition of the monomer blend is begun at such a rate that the addition time requires 3 to 3 and ½ hours. After the addition of the monomers, the temperature is raised to reflux. One hour after the monomers have been added, the ferric chloride solution is added and the sodium formaldehyde sulfoxylate is added at a rate such that three hours are required for the addition. The tertiary butyl hydroperoxide is then added in 10 equal parts at 15 minute intervals. The temperature is then raised to 90° to 95° C. and maintained at this temperature for about one hour after which the reaction mixture was cooled.

The following tables illustrate copolymers of the present invention prepared according to the procedure of Example B.

In the past, it was believed that the glass transition temperature of a polymer had to be lower than the minimum film formation temperature in order to obtain film. An examination of the art would lead one to believe that the polymers of the present invention should not form films at temperatures less than room temperature, since the glass transition temperatures of

TABLE 3

| Example No. | Olefin Percent | Olefin Type | Vinyl acetate | Comonomer A Percent | Comonomer A Type | Acrylamide (percent) | Solids (percent) | Conversion (percent) |
|---|---|---|---|---|---|---|---|---|
| 20 | 5 | $C_9$–$C_{11}$ | 71.7 | 23 | Dibutyl maleate | 0.3 | 52.5 | 94.5 |
| 21 | 5 | $C_9$–$C_{11}$ | 76.7 | 18 | Dibutyl maleate | .3 | 52.5 | 94.5 |
| 22 | 10 | $C_9$–$C_{10}$ | 66.7 | 23 | Dibutyl maleate | .3 | 51.7 | 93.0 |
| 23 | 5 | $C_{11}$–$C_{15}$ | 76.7 | 18 | Dibutyl maleate | .3 | 55.3 | 99.0 |
| 24 | 7.5 | $C_9$–$C_{10}$ | 91.95 | 0.25 | Acrylic Acid | .3 | 53.7 | 96.5 |
| 25 | 7.5 | $C_9$–$C_{10}$ | 91.7 | 0.50 | Acrylic Acid | .3 | 53.0 | 95.5 |

TABLE 4

| Example No. | 26 | 27 | 28 |
|---|---|---|---|
| Olefin ($C_9$–$C_{10}$) | 5 | 5 | 5 |
| Vinyl Acetate | 71.45 | 71.2 | 70.7 |
| Dibutyl Maleate | 23 | 23 | 23 |
| Acrylic Acid | 0.25 | 0.50 | 1.0 |
| Acrylamide | 0.3 | 0.3 | 0.3 |
| % Solids | 54.7 | 53.0 | 53.3 |
| % Conversion | 98.4 | 95.5 | 95.7 |

TABLE 5

| Example No. | 29 | 30 | 31 | 32 | 33 | 34 | 35 | 36 | 37 |
|---|---|---|---|---|---|---|---|---|---|
| Olefin: | | | | | | | | | |
| Percent | 9.5 | 10 | 9.0 | 9.0 | 8.5 | 9.0 | 18.0 | 9.0 | 9.0 |
| Type | $C_9$–$C_{10}$ | $C_9$–$C_{10}$ | $C_9$–$C_{10}$ | $C_9$–$C_{10}$ | $C_9$–$C_{10}$ | $C_9$–$C_{10}$ | $C_9$–$C_{10}$ | $C_7$–$C_9$ | $C_{11}$–$C_{15}$ |
| Vinyl Acetate | 85.2 | 89.45 | 80.7 | 80.7 | 76.2 | 80.45 | 71.45 | 80.45 | 80.7 |
| Ethyl Acrylate | 5 | — | — | 10 | 15 | — | — | — | — |
| Butyl Acrylate | — | — | 10 | — | — | 10 | 10 | 10 | 10 |
| Acrylic Acid | — | 0.25 | — | — | — | 0.25 | 0.25 | 0.25 | — |
| Acrylamide | 0.3 | 0.3 | 0.3 | 0.3 | 0.3 | 0.3 | 0.3 | 0.3 | 0.3 |
| Percent Solids | 41.75 | 43.55 | 44.2 | 42.6 | 43.2 | 42.8 | 36.6 | 41.6 | 42.4 |
| Percent Conversion | 93.4 | 97.44 | 98.9 | 95.5 | 96.0 | 95.0 | 81.0 | 92.5 | 94.1 |

TABLE 6

| Example No. | 38 | 39 | 40 | 41 | 42 | 43 |
|---|---|---|---|---|---|---|
| Olefin: | | | | | | |
| Percent | 10 | 9 | 10 | 10 | 10 | 9 |
| Type | $C_9$–$C_{10}$ | $C_9$–$C_{10}$ | $C_9$–$C_{10}$ | $C_9$–$C_{10}$ | $C_9$–$C_{10}$ | $C_6$–$C_{10}$ |
| Vinyl Acetate | 90 | 81 | 85 | 89 | 89.75 | 81 |
| Butyl Acrylate | — | 10 | — | — | — | — |
| Styrene | — | — | 5 | — | — | — |
| Triallyl cyanurate | — | — | — | — | 0.25 | — |
| Fumaric Acid | — | — | — | 1.0 | — | — |
| Vinyl Versatate* | — | — | — | — | — | 10 |
| Percent Solids | 43.40 | 43.50 | 7.20 | 42.10 | 43.40 | 54.0 |
| Percent Conversion | 96.10 | 96.20 | 16.00 | 93.5 | 96.10 | 98.2 |

*VV10 Vinyl Monomer of Shell Chemical Company, New York, New York. (Vinyl ester of a saturated tertiary alkyl carboxylic acid containing 10 carbon atoms.)

the polymers of the present invention generally run somewhat less than 20° C. However, it has unexpectedly been found that film consolidation occurs at temperatures below the glass transition temperature. In some cases, the difference between the glass transition temperature and the minimum film formation temperature is as much as 17° C.

Cross-linking monomers are particularly preferred as comonomers in the present invention. Polymers containing such comonomers are particularly suitable for use in paint and other coating compositions to impart scrub resistance. Table 7 illustrates polymers of the present invention wherein cross-linking comonomers are employed. The polymers were prepared in accordance with the procedure of Example B. The term "cross-linking monomer" as used herein is intended to refer to comonomers which provide a cross-linked structure with vinyl acetate and alpha olefin and which contain a plurality of functional groups such as olefinically-unsaturated groups or methylol groups.

about 37 percent less than provided by a lesser amount of olefin.

While the polymers described in the foregoing examples have employed the preferred alpha olefin fractions, i.e., mixture of alkenes, it should be understood that individual alpha olefins such as nonene-1, octene-1, and decene-1 are also employed satisfactorily in producing polymers within the scope of the present invention. Representative examples of such polymers are set forth in Table 9.

Table 9

| Example No. | 57 | 58 |
|---|---|---|
| Vinyl Acetate | 89.7 | 89.7 |
| Acrylamide | 0.3 | 0.3 |
| Decene-1 | 10 | — |
| Octene-1 | — | 10 |
| % Solids | 44.3 | 43.5 |
| % Conversion | 98.4 | 96.9 |

As mentioned above, the copolymer composition of the invention is particularly useful in the form of an

TABLE 7

| Example No. | 44 | 45 | 46 | 47 | 48 | 49 | 50 | 51 | 52 |
|---|---|---|---|---|---|---|---|---|---|
| Vinyl Acetate | 89.9 | 89.75 | 89.75 | 89.75 | 89.75 | 89.75 | 94.875 | 94.75 | 94.5 |
| Olefin: | | | | | | | | | |
| Percent | 10 | 10 | 10 | 10 | 10 | 10 | 5 | 5 | 5 |
| Type | $C_6-C_{10}$ | $C_6-C_{10}$ | $C_6-C_{10}$ | $C_6-C_{10}$ | $C_6-C_{10}$ | $C_6-C_{10}$ | $C_9-C_{10}$ | $C_9-C_{10}$ | $C_9-C_{10}$ |
| Triallyl cyanurate | 0.1 | | | | 0.125 | | 0.125 | | |
| Diethyleneglycoldiacrylate | | 0.25 | | | | | | | |
| Trimethylolpropanetriacrylate | | | | 0.25 | 0.125 | | | | |
| 1,4-pentadiene | | | 0.25 | | | | | | |
| 1,7-octadiene | | | | | | 0.25 | | 0.25 | 0.50 |
| Percent Solids | 44.4 | 53.4 | 52.6 | 53.5 | 53.6 | 53.0 | 54.6 | 54.7 | 54.1 |
| Percent Conversion | 98.6 | 97.0 | 95.6 | 97.3 | 97.4 | 96.5 | 99.2 | 99.3 | 98.5 |

It was stated above that the employment of the straight chain alpha olefin in the present invention provides compositions with a high degree of plasticity without the deficiencies of prior art plasticizers. The following table illustrates the unexpected, efficient, and particularly advantageous plasticizing characteristics of the compositions of the present invention as compared with prior art compositions. All samples were prepared by the procedure of Example B and the elongation, as a measure of flexibility was determined on an Instron device at 75° F. at an elongation rate of 200 percent per minute on a dumbell shaped sample wherein the component stretched was 1 inch long and 1.25 inch wide.

TABLE 8

| Ex. No. | Vynil Acetate % by weight | Acrylamide % by weight | Comonomer | % Elongation |
|---|---|---|---|---|
| 53 | 89.7 | 0.3 | 10% $C_9-C_{10}$ Olefin | 176% |
| 54 | 89.7 | 0.3 | 10% Dibutyl maleate | approx. 10% |
| 55 | 69.7 | 0.3 | 30% Dibutyl maleate | 102% |
| 56 | 83.7 | 0.3 | 16% 2-ethylhexyl acrylate | 139% |

From Table 8, above, it can be seen that an olefin employed at the 10 weight percent level imparts vastly superior flexibility characteristics to films than does considerably greater amounts of prior art plasticizing comonomers. Dibutyl maleate at the 10 percent level provides substantially no elongation while at the 30 percent level, an elongation of about 102 percent is achieved. Even 16 percent of a highly efficient comonomer, 2-ethylhexyl acrylate, provides an elongation aqueous latex in coating compositions such as aqueous based paints and adhesives. In use in aqueous based paints, the copolymer composition provides films of excellent flexibility characteristics. Such aqueous based paints generally comprise water in which pigment, for example, titanium dioxide, lithopone or zinc oxide and the film-forming or binder copolymer composition of the invention are dispersed. The amount of pigment and film-forming ingredient or binder can vary widely according to the specific ingredients employed and the end use of the composition. In the paint art, composition is conventionally expressed in terms of the ratio of pigment by volume to the total volume of the non-volatile components present in the composition (PVC). Thus an aqueous based paint composition employing the film-forming copolymer of the invention as the binder component may generally contain say about 10 to 70 percent by volume of pigment (including extenders as mentioned below) based on the total volume of the non-volatiles (pigment plus binder copolymer). Obviously the amount of water can vary widely, often anywhere between 10 and 70 percent by weight, based on the total weight of the paint. In all cases, an amount of the binder copolymer is employed which is at least sufficient to form a film upon drying.

It is the general practice to include any one or more of several optional additional ingredients in such aqueous based paints. For example, the paint compositions can include extenders such as mica, talc, china clay, barium sulphate, calcium carbonate, dolomite, calcium silicate, silica, diatomaceous earth, etc. Color may be provided through the use of organic pigments, iron oxide, chromic oxide, carbon black, sienna, umber, ochre, etc.

Aqueous based paints usually also include a variety of wetting or dispersing agents, such as polyphosphates, pyrophosphates, anionic and non-ionic surfactants, polyacrylates, polymethacrylates, polyvinyl alcohol, polyethylene glycol, etc. Additional optional ingredients further include freeze-thaw stabilizers such as ethylene glycol, diethylene glycol, and nonionic surfactants; preservatives such as organomercuric and organo-tin compounds, alkylated, halogenated or arylated phenols and their derivatives, antibiotics and many others. Still further optional ingredients include foam breakers suh as silicones, ditertiary acetylenic glycols, long-chain ethylene oxide condensates, tributyl phosphate, pine oil and higher aliphatic alcohols. Starch, casein, methyl cellulose, hydroxy ethyl cellulose, vegetable gum, etc. are also conventionally employed in aqueous based paints.

The following is a detailed, non-limiting example illustrating the use of a copolymer of the invention as the film-forming or binder component in an aqueous based paint:

Example C

| Ingredients | Parts by Weight |
|---|---|
| 1. Water | 110.0 |
| 2. Tamol 731, 25% (sodium salt of carboxylated anionic surface active agent) | 8.4 |
| 3. Igepol CTA 639 (Alkylphenylethylene oxide adduct) | 1.5 |
| 4. Tetrapotassium pyrophosphate | 1.0 |
| 5. Polyglycol P-1200 (polypropylene glycol) | 2.0 |
| 6. Mersolite 90 (phenylmercuric borate) | 0.5 |
| 7. Methocel solution, 3% (methyl cellulose; 65 HG, 4000 DG) | 70.0 |
| 8. Titanox RANC (titanium dioxide) | 200.0 |
| 9. Snowflake White (calcium carbonate | 100.0 |
| 10. Mica, 325 mesh | 30.0 |
| 11. Water | 26.0 |
| 12. Foamicide 581-B (Colloids Inc.) | 1.0 |
| 13. Carbitol Acetate (acetate of ethylene glycol monoethyl ether | 20.0 |
| 14. Water | 20.0 |
| 15. Methocel solution, 3% | 68.5 |
| 16. Latex prepared as in Example B above containing 93 percent vinyl acetate, 4 percent of nonene-1 and 3 percent butyl acrylate | 394.0 |
| 17. Ethylene glycol | 40.0 |

We claim:

1. A copolymer consisting of 50 to about 97 percent by weight vinyl acetate copolymerized with about 1 to 20 percent by weight of $C_7$ to $C_{20}$ straight chain alpha olefin and about 0.1 to 30 percent by weight of at least a third unlike copolymerizable olefinically unsaturated monomer, said third unlike monomer being selected from the group consisting of monovinyl aromatic hydrocarbons; alpha, beta olefinically unsaturated nitriles; mono-olefinically unsaturated carboxylic acids; alkyl, cyano, and amino esters of mono-olefinically unsaturated carboxylic acids; amides of acrylic acid; vinyl esters of carboxylic acids; vinyl ethers; vinyl halides; and cross-linking monomers selected from the group consisting of triallyl cyanurate, diethyleneglycoldiacrylate, trimethylolpropanetriacrylate, 1,4-pentadiene and 1,7-octadiene.

2. The copolymer of claim 1 wherein said alpha olefin comprises a $C_9$ to $C_{10}$ alpha olefin fraction.

3. A copolymer consisting of about 65 to 95 percent by weight vinyl acetate copolymerized with about 3 to 18 percent by weight of $C_7$ to $C_{20}$ straight chain alpha olefin and about 0.1 to 25 percent by weight of at least a third unlike copolymerizable olefinically unsaturated monomer, said third unlike monomer being selected from the group consisting of styrene, acrylic acid, fumaric acid, acrylamide, ethyl acrylate, butyl acrylate, 2-ethylhexylacrylate, mono-2-ethylhexyl maleate, dibutyl maleate, triallyl cyanurate, diethyleneglycoldiacrylate, trimethylolpropanetriacrylate, 1,4-pentadiene, 1,7-octadiene, and a vinyl ester of a saturated tertiary alkyl carboxylic acid.

4. A copolymer consisting of a $C_7$ to $C_{20}$ straight chain alpha olefin copolymerized with a predominant amount of vinyl acetate and at least a third unlike monomer which is selected from the group consisting of triallyl cyanurate, diethyleneglycoldiacrylate, trimethylolpropanetriacrylate, 1,7-octadiene and 1,4-pentadiene, said olefin being present in an amount of about 1 to 20 percent by weight and said third monomer being present in an amount of less than 1 percent by weight.

5. A latex coating composition comprising water and dispersed therein a film-forming amount of a polymeric component said component consisting of 50 to about 97 percent by weight vinyl acetate copolymerized with about 1 to 20 percent by weight of $C_7$ to $C_{20}$ straight chain alpha olefin and about 0.1 to 30 percent by weight of at least a third unlike copolymerizable olefinically unsaturated monomer, said third unlike monomer being selected from the group consisting of monovinyl aromatic hydrocarbons; alpha, beta-olefinically unsaturated nitriles; mono-olefinically unsaturated carboxylic acids; alkyl, cyano, and amino esters of mono-olefinically unsaturated carboxylic acids; amides of acrylic acid; vinyl esters of carboxylic acids; vinyl ethers; vinyl halides; and cross-linking monomers selected from the group consisting of triallyl cyanurate, diethyleneglycoldiacrylate, trimethylolpropanetriacrylate, 1,4-pentadiene and 1,7-octadiene.

6. The composition of claim 5 wherein the amount of said vinyl acetate present ranges from about 65 to 95 percent by weight, the amount of said olefin present ranges from about 3 to 18 percent by weight and the amount of said third monomer ranges from about 0.1 to 25 percent by weight.

7. A latex coating composition comprising water and dispersed therein a film-forming amount of a polymeric component, said component consisting of 50 to about 97 percent by weight vinyl acetate copolymerized with about 1 to 20 percent by weight of $C_7$ to $C_{20}$ straight chain alpha olefin and about 0.1 to 30 percent by weight of at least a third unlike copolymerizable olefinically unsaturated monomer.

8. The coating composition of claim 7 wherein said alpha olefin comprises a $C_9$ to $C_{10}$ alpha olefin fraction.

9. The composition of claim 7 wherein said third monomer is a cross-linking monomer containing a plurality of olefinically unsaturated groups of methylol groups and is present in an amount of less than 1 percent by weight.

10. The composition of claim 5 wherein said third unlike monomer is selected from the group consisting of styrene, acrylic acid, fumaric acid, acrylamide, ethyl acrylate, butyl acrylate, 2-ethylhexylacrylate, mono-2-ethylhexyl maleate, dibutyl maleate, triallyl cyanurate, diethyleneglycoldiacrylate, trimethylolpropanetriacrylate, 1,4-pentadiene, 1,7-octadiene, and a vinyl ester of a saturated tertiary alkyl carboxylic acid.

11. A latex coating composition comprising water and dispersed therein pigment and a film-forming amount of a polymeric component, said polymeric component consisting of about 65 to 95 percent by weight vinyl acetate copolymerized with about 3 to 18 percent by weight of $C_7$ to $C_{20}$ straight chain alpha olefin and about 0.1 to 25 percent by weight of at least a third unlike copolymerizable olefinically unsaturated monomer.

12. An aqueous latex paint composition comprising water and dispersed therein pigment and a film-forming amount of a polymeric component, said polymeric component consisting of about 50 to 97 percent by weight vinyl acetate copolymerized with about 1 to 20 percent by weight of $C_7$ to $C_{20}$ straight chain alpha olefin and about 0.1 to 30 percent by weight of at least a third unlike copolymerizable olefinically unsaturated monomer, said pigment being present in an amount of about 10 to 70 percent by volume, based on the total volume of non-volatile materials in the paint composition.

13. The paint composition of claim 12 wherein said third unlike monomer is selected from the group consisting of styrene, acrylic acid, fumaric acid, acrylamide, ethyl acrylate, butyl acrylate, 2-ethylhexylacrylate, mono-2-ethylhexyl maleate, dibutyl maleate, triallyl cyanurate, diethyleneglycoldiacrylate, trimethylolpropanetriacrylate, 1,4-pentadiene, 1,7-octadiene, and a vinyl ester of a saturated tertiary alkyl carboxylic acid.

* * * * *